United States Patent [19]

Patton

[11] 4,028,311

[45] June 7, 1977

[54] PROCESS FOR THE HYDROLYSIS OF POLY(IMINOIMIDAZOLIDINEDIONES) TO POLYPARABANIC ACIDS

[75] Inventor: Tad L. Patton, Baytown, Tex.

[73] Assignee: Exxon Research and Engineering Company, Linden, N.J.

[22] Filed: Feb. 2, 1976

[21] Appl. No.: 654,098

[52] U.S. Cl. .................. 260/77.5 R; 260/77.5 AA; 260/77.5 A
[51] Int. Cl.² .................. C08G 18/82; C08G 18/06
[58] Field of Search .............................. 260/77.5 R

[56] References Cited

UNITED STATES PATENTS 3,661,859  5/1972  Patton ........................ 260/77.5 CH Primary Examiner—H.S. Cockeram
Attorney, Agent, or Firm—David A. Roth; Ben C. Cadenhead

[57] ABSTRACT

Processes for the efficient sulfuric acid hydrolysis of poly(iminoimidazolidinediones) (PIPA) to the corresponding polyparabanic acids (PPA) have been developed. Process conditions can be manipulated to favor the formation of large crystalline particles of ammonium sulfate, a byproduct of the reaction, so that they can be readily separated from the reaction solution.

22 Claims, No Drawings

PROCESS FOR THE HYDROLYSIS OF POLY(IMINOIMIDAZOLIDINEDIONES) TO POLYPARABANIC ACIDS

CROSS-REFERENCE TO RELATED APPLICATIONS

This application is not formally related to other pending applications or issued patents, but it is an improvement of U.S. Pat. No. 3,661,859 which is incorporated by reference in its entirety.

BACKGROUND OF THE INVENTION

It is pointed out in U.S. Pat. No. 3,661,859 that poly(parabanic acids) (PPA) are made by hydrolyzing poly(iminoimidazolidinediones) which are formed by the reaction of hydrogen cyanide with diisocyanates or by the reaction of dicyanoformamides with diisocyanates or by the polymerization of cyanoformamidyl isocyanates as fully set forth therein.

The hydrolysis reaction can be carried out by contacting a solution of a poly(iminoimidazolidinedione) with an aqueous solution of a Bronsted acid such as hydrochloric, hydrobromic, sulfuric, nitric, and the like, or with anhydrous hydrogen chloride or hydrogen bromide such that when the polymer is mixed with water, hydrolysis of the imino groups will occur to convert the polymer to the desired poly(parabanic acid) which is characterized by 1,3-imidazolidine-2,4,5-trione-1,3-diyl rings.

The solution of polyiminoimidazolidinedione may be the polymerization solution in which it was prepared or it may be one which was prepared by dissolving the isolated polymer in a preferable solvent.

When an aqueous solution of acid is added to a solution of the heterocyclic polymer characterized by imino-1,3-imidazolidinedione rings, the extent of hydrolysis may be controlled by the quantity of acid used. Complete hydrolysis requires a mole of hydrogen ion per mole of imino group to be hydrolyzed. The heterocyclic polymers before and after hydrolysis are both insoluble in water; therefore, the quantity of water used to dilute the acid must be limited so that precipitation of polymer does not occur.

To prevent precipitation of the polymer by localized high concentrations of water during the addition of the aqueous acid to the polymer solution, the aqueous acid may be first diluted with the same solvent in which the polymer is dissolved and this mixture then added to the polymer solution.

Hydrolysis occurs rapidly in the presence of an excess amount of acid and may be complete within a few minutes at room temperature. The general temperature conditions for hydrolysis are between 10° and 120° C., preferably between 30° to 60° C. The hydrolysis conditions may be maintained for a few minutes or for several hours. (See U.S. Pat. No. 3,661,859.)

Thus, poly(iminoimidazolidinediones) are readily converted to poly(parabanic acids) by acid hydrolysis.

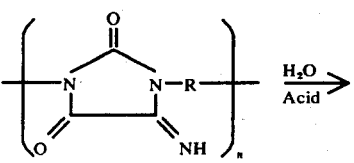

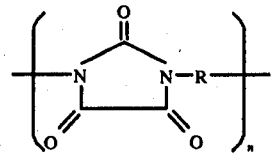

SUMMARY OF THE INVENTION

Processes for hydrolyzing poly(iminoimidazolidinediones) to poly(parabanic acids) using stoichiometric quantities of sulfuric acid and conditions which promote the formation of large crystals of ammonium sulfate, a by-product of the hydrolysis reaction, are described.

DESCRIPTION OF THE PREFERRED EMBODIMENTS

Sulfuric acid is the preferred acid to use because ammonium sulfate is less soluble and thus more easily separated from the polymer solution than the ammonium salts of other acids such as hydrochloric, hydrobromic and nitric in dimethylformamide, dimethylacetamide, dimethylsulfoxide, and N-methyl pyrrolidone and other dipolar aprotic solvents.

The reaction is:

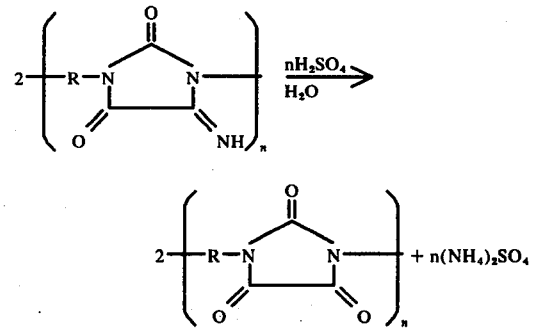

Stoichiometrically, only 0.5 mole of sulfuric acid and 1 mole of water per mole of imino group in the repeating unit of the polymer chain is required for complete hydrolysis. However, at ambient and up to 60° C. reaction temperatures during hydrolysis, it was necessary to use at least one mole of sulfuric acid per mole of imino group to hydrolyze all of the imino groups present.

It was observed that when clarified (by centrifugation) reaction solutions of PPA-M which contained dissolved ammonium bisulfate were gently heated, ammonium sulfate separated from solution. As the temperature was increased to 100° C., the rate of separation increased. The salt remained insoluble after the solutions had cooled to room temperature. It was also observed that the quantity of insoluble ammonium sulfate which separated from polyparabanic acid reaction solutions at room temperature increased slowly over a period of several weeks.

This observation was extended to a clear saturated solution of ammonium bisulfate in DMF. It was found that ammonium sulfate formed and separated from the solution at a rate which increased rapidly as the temperature was increased. In addition, the pH of the solution decreased from about 1.2 to 1.05 (measured after cooling to 25° C.). Thus, it became obvious that the complete hydrolysis of PIPA to PPA using only 0.5 mole of sulfuric acid per mole of imino group should be possible at elevated temperatures. It is probably due in large part to the increased rate at this higher temperature of the following reaction which converts the bisulfate salt to ammonium sulfate and the strongly acidic sulfuric acid:

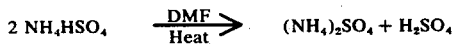

$$2\ NH_4HSO_4 \xrightarrow[\text{Heat}]{\text{DMF}} (NH_4)_2SO_4 + H_2SO_4$$

Apparently, ammonium bisulfate is not acidic enough in this environment to hydrolyze the imino groups.

Conditions have been found wherein complete hydrolysis occurs when only 0.5 mole of sulfuric acid per mole of imino group is used in the reaction. By using a solution which contains at least 0.50 mole, preferably 0.5 to 0.8, most preferably 0.502–0.506 mole of sulfuric acid and 1–20 moles, preferably 4–10 moles of water per mole of imino group, complete hydrolysis of poly(iminoimidazolidinedione) to poly(parabanic acid) occurs if the polymer solution is heated at 80°–110° C., preferably 85°–90° C., for 5–120 minutes, preferably 15–20 minutes. At this temperature, the initially formed ammonium bisulfate is converted to sulfuric acid and the less soluble ammonium sulfate. The sulfuric acid is then available for further reaction with another imino group. This continues until the sulfuric acid is depleted or all imino groups are hydrolyzed.

Since most of the ammonium sulfate precipitates from solution, it can be removed by filtration or centrifugation. In addition to other factors, such as solution viscosity and filter porosity, the rate of clarification by centrifugation and filtration is dependent on the size of the ammonium sulfate crystals.

It has been found that the size of the ammonium sulfate crystals is dependent upon the quantity of water used to hydrolyze the poly(iminoimidazoldienedione) and upon the procedure used to add the sulfuric acid and water to the polymer in organic solvent solution. The polymer solution which is to be mixed with the acid and water normally contains 5 to 15 grams of polymer per 100 ml. of solution, although solutions containing less than 5 grams or more than 15 grams of polymer per 100 ml. may be used.

The dramatic effect of the quantity of water on the average crystal size of the ammonium sulfate formed during the hydrolysis reaction is revealed by the results described in Examples 10–15. The crystals were very small when the concentration of water was low.

Several procedures for adding the acid and water to a poly(iminoimidazlidinedione) solution have been used to hydrolyze the polymer to poly(parabanic acid). Insofar as the desired polymer reaction is concerned, all of the procedures give equally satisfactory results. However, the average sizes of the ammonium sulfate crystals formed during the reactions are not the same by all of the procedures. The procedures are identical with regard to the relative quantities of sulfuric acid and water used, the temperature (80°–120° C., preferably 85°–95° C.) and time (10–60 minutes, preferably 15–20 minutes) of reaction. The procedures differ from one another by the technique used to add the sulfuric acid and water to the polymer solution.

The following procedures for adding the acid and water to solutions of poly(iminoimidazolidinediones) in dimethylformamide, N-methylpyrrolidone, N,N-dimethylacetamide, dimethylsulfoxide, or other suitable solvents may be used.

A. An acid solution containing sulfuric acid, water and the solvent in which the polymer is dissolved is added to the poly(iminomidazolidinedione) solution. The temperature of the polymer solution may be 20°–100° C., preferably 50°–80° C. Although the temperature of the acid solution may be as high as 120° C., it is preferable that it be no higher than 10° C. if relatively large, easily filtered crystals of ammonium sulfate are to be formed. (See Examples 16–22.)

B. The required quantity of 90–100%, preferably 95–97%, sulfuric acid is added to the poly(iminoimidazolidinedione) solution; then a solution of the water in the polymer solvent is added to the solution (Examples 23 and 24). Initially the temperature of the polymer solution has a temperature of 20°–100° C., preferably 40°–80° C., while the temperature of the acid is conveniently 15°–30° C., and that of the aqueous dimethylformamide solution is 5°–100° C., preferably 15°–50° C.

C. An aqueous solution of sulfuric acid is added to the poly(iminoimidazolidinedione) solution (Example 25). Since the acid solution is not diluted with the polymer solvent, it is necessary to control the rate of addition and to provide adequate agitation of the polymer solution so that the aqueous solution does not precipitate polymer. The temperature of the acid solution may be 10°–100° C., but preferably is 15°–50° C.

D. The calculated quantity of 96% sulfuric acid is added to the poly(iminoimidazolidinedione) solution; then the water required to complete the hydrolysis is added at a rate and with adequate agitation of the polymer solution so that precipitation of the polymer does not occur (Example 26). The initial temperature of the polymer solution may be 20°–100° C., preferably 50°–80° C. The temperature of the acid and water are conveniently ambient, usually 15°–30° C.

The average sizes of ammonium sulfate crystals formed in the hydrolysis reaction are acceptably large if procedures B, C, and D are used; procedure A may be used satisfactorily if the temperature of the acid solution is 10° C. or lower. Procedure D is preferred because it does not require additional solvent, it is not necessary to prepare an acid solution and cool it, and it utilizes the heats of solutions of the acid and water in each other and in the polymer solvent to increase the temperature of the polymer solution toward the desired range. Experiments in which each of these procedures have been used are described in the Examples of this disclosure.

EXAMPLE 1

A solution of poly(iminoimidazolidinedione) was prepared by the reaction of 125.0 gms. (0.50 mole) of diphenylmethane diisocyanate with 13.9 gms. (0.51 mole) of hydrogen cyanide in 1160 ml. of dimethylformamide. The reaction was catalyzed by 0.08 gm. of sodium cyanide in 20 ml. of dimethylformamide. After 30 minutes, the polymerization was complete. A solution of 54.1 gms. (0.53 mole) of 96% sulfuric acid, 36.0 gms. (2 moles) of water, and 36 ml. dimethylformamide was then added to the solution. An exothermic reaction ensued and the temperature increased from 36° C. up to 45° C. After 30 minutes the reaction solution was filtered and poured into water to precipitate the poly(parabanic acid) which had an inherent viscosity of 0.92.

In this example, the equivalent of 1.06 moles of sulfuric acid per mole of imino group (which is equivalent to the moles of diphenylmethane diisocyanate used in the polymerization) was used for the hydrolysis. The infrared spectrum of the product showed that it was the desired poly(parabanic acid); there was no evidence of bands at $3.06\mu$ (NH) and $5.98\mu$ (C=N) which characterize the iminoimidazolidinedione ring in the poly(iminoimidazolidinedione) which was hydrolyzed.

EXAMPLE 2

This example is identical to Example 1, except that the equivalent of only 0.56 moles of sulfuric acid per mole of imino group was used for the hydrolysis. The infrared spectrum of the polymer product indicated that some of the imino groups had not been hydrolyzed. In addition to the absorption peaks which were characteristic of the poly(parabanic acid), there were absorption peaks at 3.04 and $5.98\mu$ which are characteristic of the N—H and C=N groups which are in the poly(iminoimidazolidinedione).

These results show that under these reaction conditions (maximum temperature of 45° C.), poly(iminoimidazolidinedione) was not completely hydrolyzed to the corresponding poly(parabanic acid) by the use of only 0.56 mole of sulfuric acid per mole of imino group.

EXAMPLE 3

In this example, exactly 1 mole of sulfuric acid per mole of imino group in the poly(iminoimidazolidinedione) solution was used for the hydrolysis. This illustrates the necessity of the use of an excess of sulfuric acid in the hydrolysis reaction when the reaction temperature is no higher than about 50° C.

The polymerization in Example 1 was repeated using the same quantities of starting materials. Then, only 51.0 gms. (0.50 mole) of 96% sulfuric acid in 36.0 gms. (2 moles) of water and 36 ml. of dimethylformamide was added to the poly(iminoimidazolidinedione) solution to hydrolyze it to the corresponding poly(parabanic acid). The infrared spectrum of the product showed that some of the imino groups had not been hydrolyzed. The polymer was mostly the poly(parabanic acid) but contained some iminoimidazolidinedione rings as evidenced by the presence of weak absorption bands at $3.06\mu$ (N-H) and $5.98\mu$ (C=N).

EXAMPLE 4

This example demonstrates that 0.502 moles of sulfuric acid will completely hydrolyze 1 mole of repeating unit in a poly(iminoimidazolidinedione) when the solution is heated at 85° C. for at least 15 minutes.

To a solution of 193 gms. (0.772 mole) of diphenylmethane diisocyanate and 21.3 gms. (0.79 mole) of hydrogen cyanide in 1800 ml. of dimethylformamide, was added a solution of 0.075 gm. of sodium cyanide in 9.5 ml. of dimethylformamide. The exothermic reaction raised the temperature from 29° C. up to 47° C. After 30 minutes an acid solution composed of 39.6 gms. (0.388 mole) of 96% sulfuric acid, 13.9 gms. (0.77 mole) of water and 100 ml. of dimethylformamide was added slowly to the viscous solution of poly(iminoimidazolidinedione). The temperature was increased to 85° C. and held there for 15 minutes. The polymer was then precipitated by pouring the solution into water. The poly(parabanic acid) had an inherent viscosity of 1.30. The infrared spectrum of a thin film of the product was identical to that of a thin film of an authentic specimen of the poly(parabanic acid) expected. The complete absence of absorption bands at 3.04 and $5.98\mu$ which are characteristic of the N-H group and the exocyclic C=N, respectively, and are present in the polymer before hydrolysis provided proof that hydrolysis had been complete.

EXAMPLES 5-8

Poly(iminoimidazolidinediones) were hydrolyzed to the corresponding poly(parabanic acids) using 0.502–0.507 moles of sulfuric acid per mole of imino group in the polymer solutions. The quantity of water was varied from one (theoretically all that is required) to 4 moles per mole of imino group. The results (see table below) show that only 1 mole of water per mole of imino group was necessary, particularly if the polymer was precipitated in water. Each solution was heated 15 minutes at 85°–90° C.

| Ex. | Moles of Imino Groups to Hydrolyze | Moles of $H_2SO_4$ | Moles of $H_2O$ | Hydrolysis[a] Complete |
|---|---|---|---|---|
| 5 | 1 | 0.503 | 1 | Yes |
| 6 | 1 | 0.506 | 2 | Yes |
| 7 | 1 | 0.502 | 3 | Yes |
| 8 | 1 | 0.507 | 4 | Yes |

[a]Hydrolysis was considered complete if no absorption peaks at $3.04\mu$ (=NH) and $5.98\mu$ (exocyclic C=N) were observed; they are characteristic of iminoimidazolidinedione rings.

EXAMPLE 9

A solution of a poly(iminoimidazolidinedione) was prepared from 670 g. (2.66 moles) of 4,4'-diphenyl ether diisocyanate and 73.9 g. (2.73 moles) of hydrogen cyanide in 6.2 l. of dimethylformamide using 0.3 g. of sodium cyanide as catalyst. The polymer was hydrolyzed by mixing it with 137.5 g. (1.35 moles) of 96% sulfuric acid (0.506 mole per mole of imino group) and 191.5 g. (10.6 moles) of water (4 moles per mole of imino group). The solution was stirred and heated at 85°–90° C. for 15 minutes. The polymer was precipitated by pouring the reaction solution into water with vigorous agitation. The polymer had an inherent viscosity of 0.72. The infrared spectrum of the polymer indicated that it was the expected poly(parabanic acid) and that hydrolysis of the precursor polymer had been complete.

EXAMPLES 10-15

The results of these examples reveal the effect of water concentration in the hydrolysis reaction solution on the crystalline particle sizes of ammonium sulfate which formed and precipitated from solution.

The poly(iminoimidazolidinedione) which was hydrolyzed in each of these examples was prepared as follows. To a solution of 663 g. (2.65 moles) of diphenylmethane diisocyanate, 2.2 g. (0.018 mole) of phenyl isocyanate and 73.5 g. (2.72 moles) of hydrogen cyanide in 6140 ml. of dimethylformamide was added a solution which contained 0.26 g. of sodium cyanide in 35 ml. of dimethylformamide. The exothermic reaction raised the temperature from 26° C. up to 48° C. After 30 minutes the poly(iminoimidazolidinedione) which had formed was hydrolyzed by adding 0.506 moles of sulfuric acid per mole of imino group and water to the reaction solution; the quantity of water used in each experiment is recorded in the table below. Th hydrolysis solutions were heated 15 minutes at 80°–100° C.

The ammonium sulfate which precipitated was separated from each solution by filtration. Poly(parabanic acid) was precipitated by mixing each filtrate with distilled water. The inherent viscosities of the polymers varied from 0.80–0.95.

The ammonium sulfate crystals from each experiment were examined under a microscope. The sizes of the crystals were determined by comparing photomicrographs of the crystals with that of a calibrated scale at the same magnification. The results show that significantly larger crystals are formed in those reactions wherein 10 moles of water per mole of imino group was used to hydrolyze the poly(iminoimidazolidinedione) than in those reactions wherein only 1.5 moles of water was used. In the former, the water concentration in the final polymer solution was only about 0.3%, while it was about 5.5% in the latter polymer solutions.

| Ex. No. | Moles of $H_2O$ | Ammonium Sulfate Crystal Sizes (Microns) | |
|---|---|---|---|
| | | Width | Length |
| 10 | 1.5 | 3–8 | 10–20 |
| 11 | 1.5 | 5–8 | 10–30 |
| 12 | 1.5 | 5–8 | 10–30 |
| 13 | 10 | 5–10 | 30–70 |
| 14 | 10 | 5–10 | 30–70 |
| 15 | 10 | 5–10 | 30–70 |

EXAMPLES 16–22

In these examples, solutions of poly(iminoimidazolidinediones) which had been made from diphenylmethane diisocyanate and hydrogen cyanide were mixed with an acid solution which contained 0.51 moles of sulfuric acid, 10 moles of water, and 180 ml. of dimethylformamide for every mole of imino group in the polymer solution. The moles of imino group were assumed to be equal to the moles of diphenylmethane diisocyanate used to make the polymer. The temperature of each acid solution when it was added to the polymer solution is recorded in the table below. Before adding the acid solution, the temperature of each polymer solution was 40°–45° C. After the acid solution had been added, each reaction solution was heated 15 minutes at 85°–90° C.

Ammonium sulfate crystals were collected from each solution and they were examined and measured by the same technique used in Examples 10–15. The results (see table below) indicate that relatively large crystals of ammonium sulfate formed when the temperature of the acid solution was less than 10° C. at addition.

| Ex. No. | Acid Solution Temperature, ° C. | Salt Size (Microns) |
|---|---|---|
| 16 | 15 | 10–40 |
| 17 | 14 | 10–40 |
| 18 | 24 | 10–30 |
| 19 | 14 | 10–40 |
| 20 | 24 | 5–20 |
| 21 | 7 | 40–80 |
| 22 | 7 | 40–80 |

EXAMPLE 23

A solution which contained 250 g. of dimethylformamide and 31.0 g. (0.112 moles of imino groups) of a poly(iminoimidazolidinedione) which had been prepared from diphenylmethane diisocyanate and hydrogen cyanide was used in this example. To the stirred solution was added 6.0 g. (0.058 mole) of 96% sulfuric acid. The temperature increased from 30° C. up to 39° C. After 15 minutes a solution of 20.2 g. (1.12 moles) of water in 25 ml. of dimethylformamide was added to the solution with rapid stirring. It was heated 15 minutes at 85° C. The polymer was precipitated from solution and shown to be identical to an authentic specimen of the expected poly(parabanic acid). The crystals of ammonium sulfate were found to be 30–50 microns long and 8–10 microns wide.

EXAMPLE 24

A poly(iminoimidazolidinedione) was prepared by reacting 16.1 g. (0.596 mole) of hydrogen cyanide with 144.5 g. (0.578 mole) of diphenylmethane diisocyanate in 1340 ml. of dimethylformamide in the presence of 0.05 g. of sodium cyanide. The polymer was hydrolyzed by adding 30.1 g. (0.295 mole) of 96% sulfuric acid to the stirred reaction solution. The temperature of the polymer solution was 52° C. After 1 minute a solution of 104 g. (5.78 moles) of water in 104 ml. of dimethylformamide was added. After heating the solution for 15 minutes at 85° C., it was filtered to remove the ammonium sulfate which had formed. The polymer which was precipitated from solution was the expected poly(parabanic acid), and the infrared spectrum of the product indicated that hydrolysis of the precursor polymer was complete.

The crystals of ammonium sulfate were relatively large, measuring 40–100 microns long and 8–10 microns wide.

EXAMPLE 25

To a solution of 270 ml. of dimethylformamide and 36 g. (0.13 mole of imino groups) of a poly(iminoimidazolidinedione) which had been prepared from diphenylmethane diisocyanate and hydrogen cyanide was added a hot (82° C.) solution of 6.8 g. (0.067 mole) of 96% sulfuric acid in 23.4 ml. of water. Stirring was vigorous. The solution was heated 15 minutes at 85°–93° C. The salts were separated by filtration, and the polymer was precipitated by pouring the clear filtrate into water. The polymer was the expected poly(parabanic acid).

The ammonium sulfate salt crystals were 8–10 microns wide and 20–40 microns long.

EXAMPLE 26

A solution of a poly(iminoimidazolidinedione) was prepared by the reaction of 610 g. (2.44 mole) of diphenylmethane diisocyanate with 67.5 g. (2.5 mole) of hydrogen cyanide in 5600 ml. of dimethylformamide in the presence of 0.24 g. of sodium cyanide. It was hydrolyzed by adding 127 g. (1.24 moles) of 96% sulfuric acid to the stirred reaction solution (44° C.). As soon as the acid has been added, 439 g. (24.4 mole) of water was added and the solution was heated at 85°–90° C. for 15 minutes. The ammonium sulfate which was formed and precipitated from solution was separated by filtration. Polymer which was precipitated from the filtrate was identical to an authentic specimen of the expected poly(parabanic acid).

The crystals of ammonium sulfate were 8–10 microns wide and 40–80 microns long.

What is claimed is:

1. In the sulfuric acid hydrolysis of polymers containing repeating iminoimidazolidinedione units to polymers containing repeating parabanic acid groups, the improvement which comprises contacting a polymer solution containing repeating iminoimidazolidinedione units with 0.5 to 0.8 moles of sulfuric acid and 1 to 20 moles of water for each mole of iminoimidazolidinedione group in said polymer solution
    i. at a temperature of 80° to 110° C
    ii. for a hydrolysis reaction time of 5 to 60 minutes
    iii. while maintaining the polymer in solution
to cause a substantially complete hydrolysis to polymers containing said parabanic acid groups, and to form large, easily filtered crystals of by-product ammonium sulfate.

2. The process of claim 1 wherein the number of moles of sulfuric acid is about 0.502 to 0.506 per mole of imino group to be hydrolyzed.

3. The process of claim 1 wherein the temperature is 85° to 90° C.

4. The process of claim 1 wherein the reaction time is from 15 to 20 minutes.

5. The process of claim 1 wherein the number of moles of sulfuric acid is about 0.502 to 0.506 per mole of imino group at a temperature of 85° to 90° C for a time of from 15 to 20 minutes.

6. The process of claim 1 whereby large easily filtered crystals are formed by carrying out said hydrolysis reaction in the presence of 5 to 10 moles of water per mole of repeating imino group.

7. The process of claim 5 whereby large easily filtered crystals are formed by carrying out said hydrolysis reaction in the presence of 5 to 10 moles of water per mole of repeating imino group.

8. The process of claim 6 wherein said $H_2O$ and sulfuric acid in the presence of some solvent in which the iminoimidazolidinedione-containing polymer is dissolved is added to a solution of said polymer to cause hydrolysis of the imino groups.

9. The process of claim 8 wherein the temperature of the solution of acid, water, and solvent is 10° C or less when it is added to the polymer solution.

10. The process of claim 6 wherein said sulfurice acid is added first to a solution of the polymer to be hydrolyzed followed by a second solution of said water in a quantity of the solvent for the polymer wherein said solvent in said second solution is present in at least a 1:1 volumetric ratio to $H_2O$.

11. The process of claim 6 wherein said sulfuric acid is added first to said polymer solution and said water is then added slowly with agitation to prevent polymer precipitation.

12. The process of claim 6 wherein a combination of said sulfuric acid and water without solvent is added to said polymer solution with agitation to prevent polymer precipitation.

13. The process according to claim 6 wherein the temperature of the poly(iminoimidazolidinedione) solution is 20°–100° C. before the acid and water are added.

14. The process according to claim 7 wherein the temperature of the poly(iminoimidazolidinedione) solution is 20°–100° C. before the acid and water are added.

15. The process according to claim 8 wherein the temperature of the poly(iminoimidazolidinedione) solution is 20°–100° C. before the acid and water are added.

16. The process according to claim 9 wherein the temperature of the poly(iminoimidazolidinedione) solution is 20°–100° C. before the acid and water are added.

17. The process according to claim 10 wherein the temperature of the poly(iminoimidazolidinedione) solution is 20°–100° C. before the acid and water are added.

18. The process according to claim 11 wherein the temperature of the poly(iminoimidazolidinedione) solution is 20°–100° C. before the acid and water are added.

19. The process according to claim 12 wherein the temperature of the poly(iminoimidazolidinedione) solution is 20°–100° C. before the acid and water are added.

20. The process according to claim 1 wherein the polymer to be hydrolyzed has the following repeating units

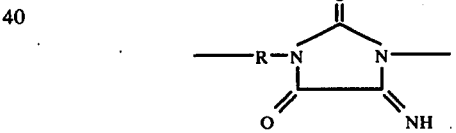

where R is an organic moiety selected from the group of aliphatic, alicyclic, aromatic moieties and mixtures thereof and functionally substituted derivatives thereof which do not react with HCN or an —NCO group.

21. The process of claim 20 wherein R is diphenylmethane.

22. The process of claim 20 wherein R is diphenylether.

* * * * *